July 30, 1963     C. W. PINKLEY     3,099,793
RESONANCE SEEKING CIRCUIT

Filed Oct. 3, 1960     4 Sheets-Sheet 1

INVENTOR
Clyde W. Pinkley
BY Anthony D. Cennamo

July 30, 1963 C. W. PINKLEY 3,099,793
RESONANCE SEEKING CIRCUIT
Filed Oct. 3, 1960 4 Sheets-Sheet 2

INVENTOR
Clyde W. Pinkley
BY Anthony D. Cennamo

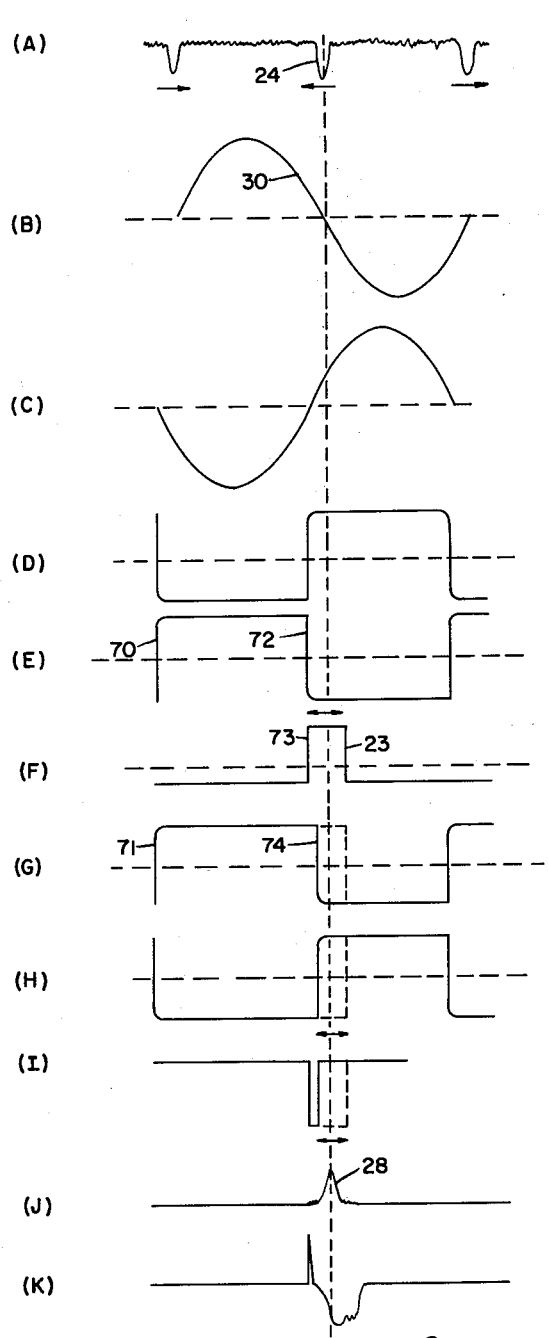

United States Patent Office 3,099,793
Patented July 30, 1963

3,099,793
RESONANCE SEEKING CIRCUIT
Clyde W. Pinkley, Columbus, Ohio, assignor to Industrial Nucleonics Corporation, a corporation of Ohio
Filed Oct. 3, 1960, Ser. No. 60,039
7 Claims. (Cl. 324—.5)

This invention relates to nuclear magnetic resonance measuring and control devices, and in particular to new and improved apparatus for automatically controlling the relative relationship between the magnetic and radio-frequency fields of such devices so as to satisfy the requirements for nuclear resonance.

It is well known in the prior art relating to nuclear physics that many atomic nuclei possess magnetic moment and nuclear momentum or "spin." A nucleus having these characteristics displays gyroscopic effects and is therefore often considered analogous to a spinning gyroscope having a magnet positioned along its axis.

When such nuclei are subjected to a unidirectional magnetic field, the spinning nuclei initially tend to precess around an axis parallel to the magnetic field. After a period of time, damping forces suppress the nuclear precession enabling the nuclear moments to line up with the magnetic field. In the event the polarized nuclei are subjected to a radio-frequency field at right angles to the magnetic field, nuclear precession is again initiated.

Prior investigators have studied the gyroscopic properties of nuclei by subjecting an element to a magnetic field produced by a permanent magnet and simultaneously irradiating the element with radio-frequency electromagnetic energy emanating from a tank coil.

When the frequency of the radio-frequency source resonates with the frequency of nuclear precession, the spinning nuclei absorb a maximum amount of energy from the radio-frequency field thereby loading the tank circuit. It has been determined that the resonant frequency of nuclear precession varies for different elements and for different values of the polarizing magnetic field.

Within recent years, measuring devices have been proposed operative in response to the energy absorption occurring at the nuclear magnetic resonance frequency. From this absorption measurement, the relative proportion of an element in question can be determined because the total energy absorbed is a function of the number of nuclei present. Apparatus of this type can be used for the quantitative determination of any element the nucleus of which possesses angular momentum and magnetic moment, such as for example, hydrogen, helium, lithium, beryllium, boron, and nitrogen. Additionally, quantitative determination of various isotopes of elements can also be made, because in many cases the different isotopes have different resonant frequencies.

The absorption phenomenon of nuclear magnetic resonance is also used to measure constituent proportions in various compounds. For example, moisture content measurements can be made in materials, such as tobacco or paper. In such a determination the water content is not measured directly but, rather, indirectly by the amount of hydrogen present. By applying the same principles it is possible to measure the presence of any compound which contains at least one element the nucleus of which possesses angular momentum and magnetic moment.

In conventional nuclear magnetic resonance apparatus, radio-frequency current from a constant-current source is supplied to a parallel tuned circuit consisting of a coil and capacitor. The tank coil is placed within the uniform field of a permanent magnet so that the radio-frequency field is perpendicular to the magnetic field, and the material to be measured is placed within the coil. The radio-frequency field, or the magnetic field, is modulated at a slow audio rate. When the radio-frequency and the magnetic fields satisfy the relation $$f_0 = \frac{\gamma}{2\pi} H_0$$

where "$f_0$" is the frequency of the radio-frequency field, "$H_0$" is the permanent magnetic field strength in gauss, and "$\gamma$" is a constant dependent on the type of nucleus subjected to resonance, nuclear magnetic resonance occurs. In moisture measurements, the hydrogen nucleus is caused to resonate, and "$\gamma$" equals $2.67 \times 10^4$ sec.$^{-1}$ gauss$^{-1}$.

The resulting nuclear resonance causes a decrease in the impedance of the tank circuit, and therefore a decrease in the voltage appearing across the tank circuit. For a given set of conditions the magnitude of this change in voltage is proportional to the amount of moisture present so that a quantitative measurement can be made.

The use of the nuclear magnetic resonance phenomenon in the measurement and control of the moisture content of various materials requires precise functioning of the measuring apparatus. In the event the required relationship between magnetic field intensity and the frequency of the radio-frequency field is not maintained, loss of resonance will render the measurement and control functions ineffective. Loss of resonance can occur as a result of excessive variations in the intensity of the magnetic field, changes in the magnetic flux path, or through drift in the frequency of the radio-frequency field.

Accordingly, a principal object of this invention is to improve the reliability of nuclear magnetic resonance measuring and control devices by preventing loss of resonance with respect to a particular nucleus under test.

Another object of this invention is to provide improved nuclear magnetic resonance apparatus by controlling the frequency of the radio-frequency field relative to the intensity of the magnetic field.

Another object is to provide an automatic resonance seeking circuit for nuclear magnetic resonance apparatus in which the conditions for resonance are obtained automatically when a sample to be tested is placed within a measuring probe.

Another object is to provide a visual monitor which will indicate to an operator when nuclear magnetic resonance apparatus is seeking resonance conditions and when such conditions have been attained.

The invention may be associated with most of the magnet and coil assemblies employed in the prior art for generating the transverse magnetic and radio-frequency fields required for nuclear magnetic resonance measurements. In these equipments, a constant-current, radio-frequency oscillator is usually employed to energize the coil, and modulation coils may be coupled to the magnet so that the magnetic field is amplitude modulated at a slow rate. As the magnetic field periodically sweeps through the intensity value required to produce a condition of resonance for the frequency of the radio-frequency field, the nuclei under test absorb energy.

A principal feature of this invention relates to a resonance control circuit interconecting a measurement readout circuit and the radio-frequency oscillator so that a condition of nuclear resonance can be maintained through continuous satisfaction of the relationship $$f_0 = \frac{\gamma}{2\pi} H_0$$

The resonance control causes the energizing frequency of the oscillator to vary in response to attempted changes in the time relationship between the resonance absorption pulse and a signal gate pulse that actuates a switching circuit contained in the readout circuit. In a preferred mode of operation, the radio frequency is varied so that a resonance absorption pulse coincides timewise with the center of each signal gate pulse. The signal gate pulse is in turn centered timewise with the field-strength null points of each modulation cycle.

In the event the resonance absorption pulse deviates timewise from its center position relative the signal gate pulse, a frequency error voltage is generated which operates a reactance tube frequency control to adjust the frequency of the radio-frequency oscillator to reposition the absorption pulse relative the center of the signal gate pulse.

In order that all of the features for attaining the objects of this invention may be readily understood, reference is herein made to the drawings wherein.

Figure 3:
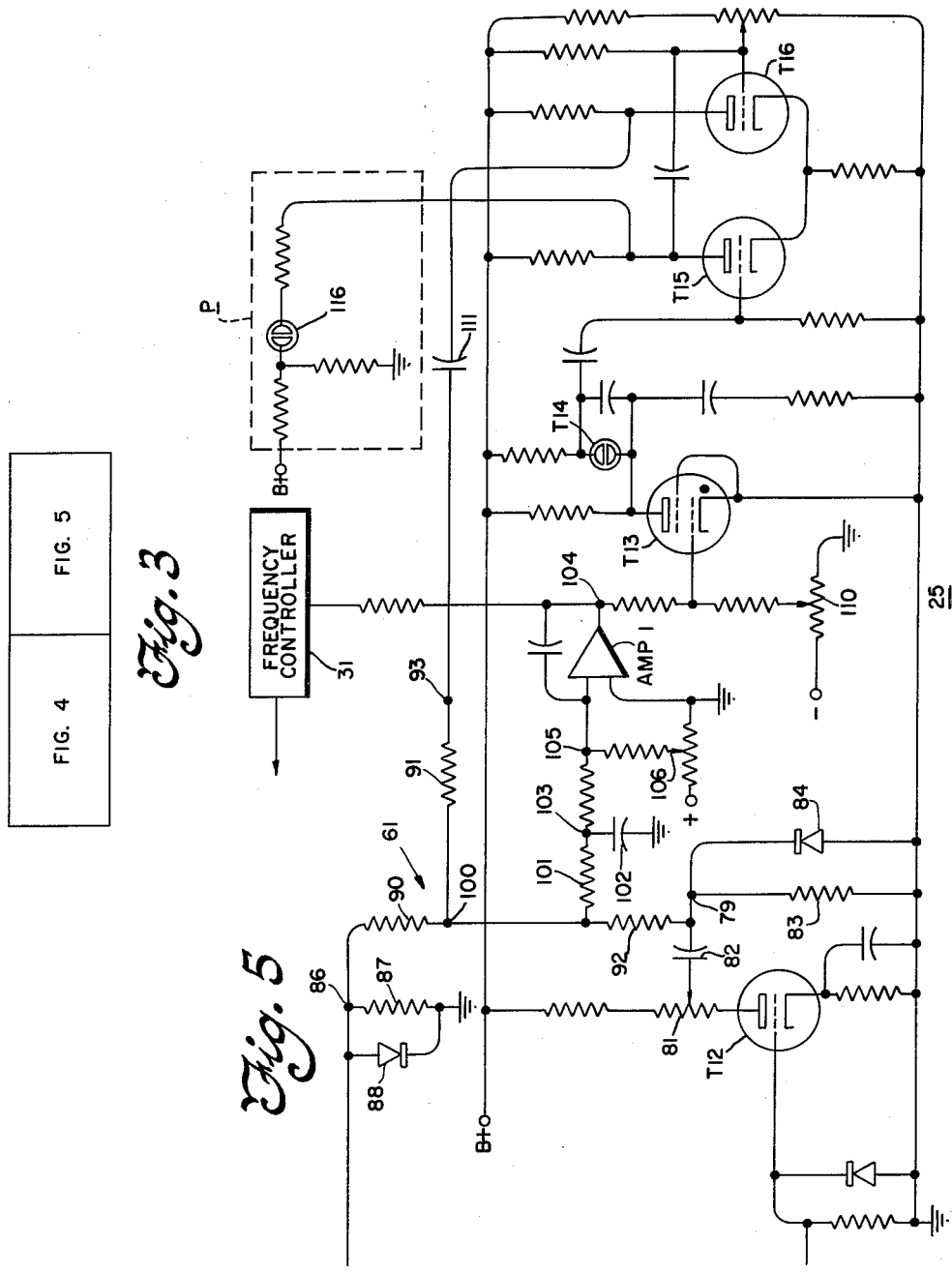
FIG. 3 is a diagram of assistance showing the manner in which FIGS. 4 and 5 should be combined in order to form a complete schematic diagram.
Figure 4:
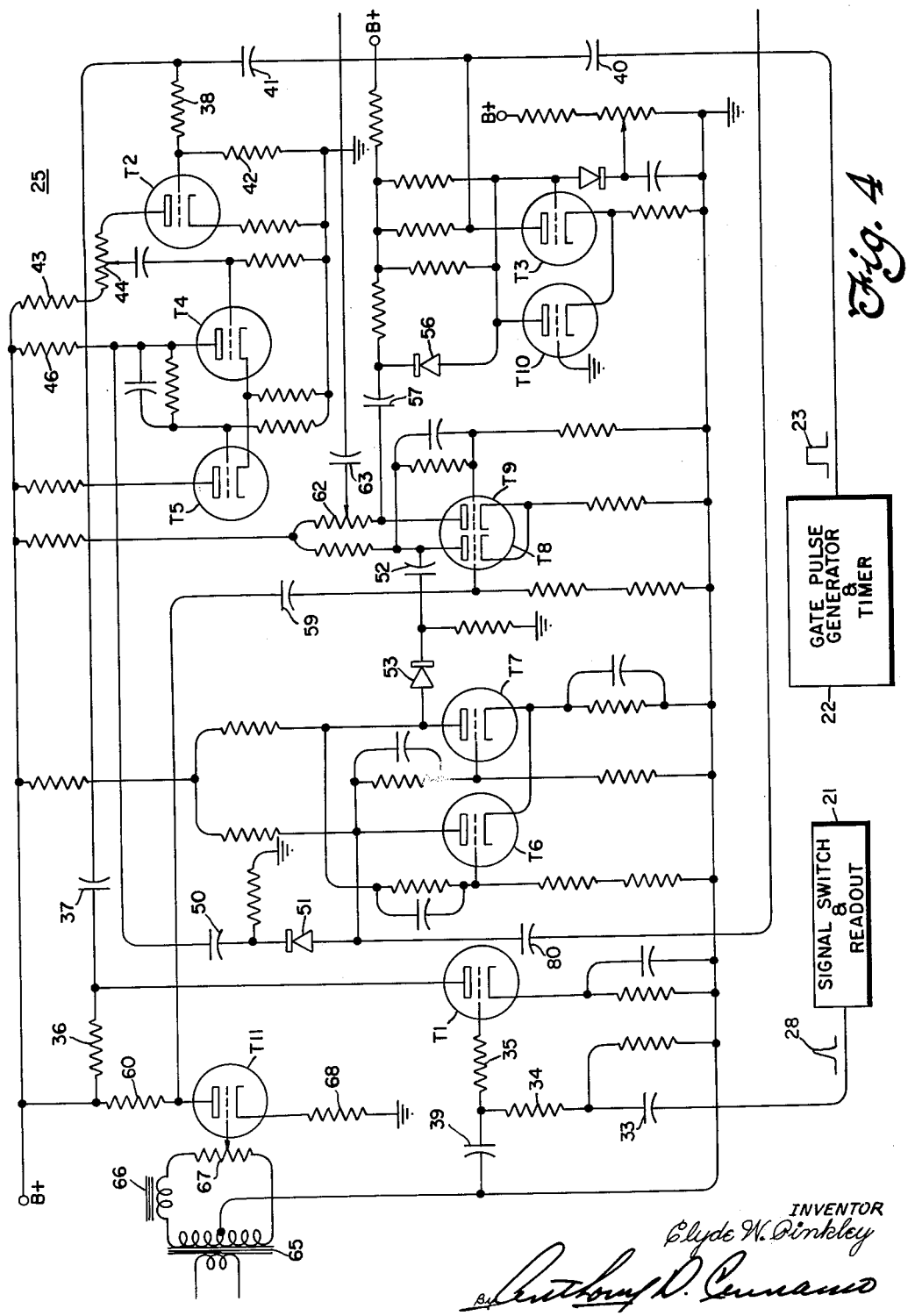

FIGS. 4 and 5, when combined as shown in FIG. 3, form a detailed schematic diagram of the resonance control of this invention;

FIG. 6 is a group of waveforms showing the signals appearing at various points of the circuit of combined FIGS. 4 and 5.

Figure 1:
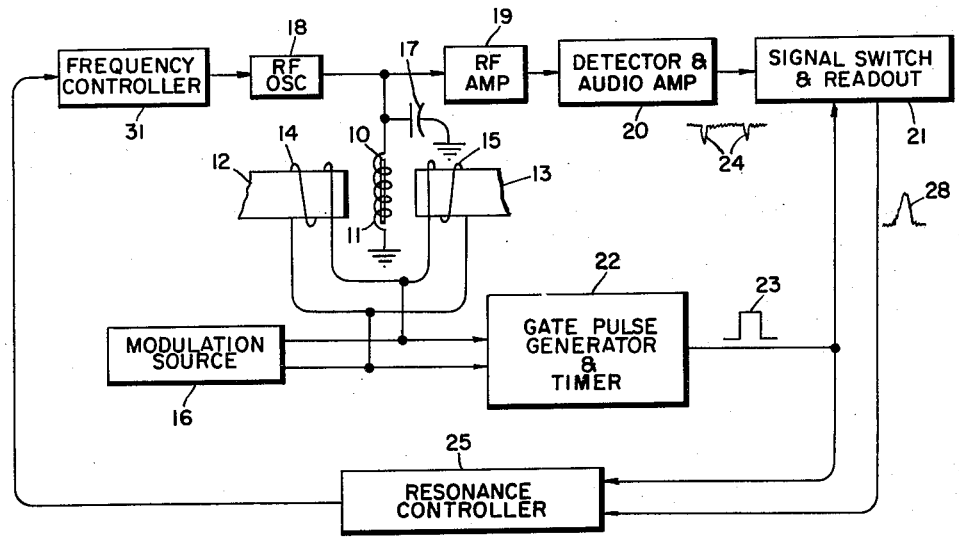
FIG. 1 is a block diagram of nuclear resonance measuring apparatus employing the resonance control of this invention.

Referring now to FIG. 1, sample material 10 under test is positioned in the center of radio-frequency sampling coil 11 of a measuring probe, and is thereby subjected to a radio-frequency field parallel to the longitudinal axis of coil 11. Material 10 is also subjected to a transverse magnetic field developed in the gap between permanent magnets 12 and 13. Modulation coils 14 and 15 envelop the pole ends of magnets 12 and 13, respectively, so that the otherwise steady magnetic field is amplitude modulated by the audio-frequency energy supplied from modulation source 16.

Capacitor 17 shunts coil 11 so that the combination 11—17 forms a parallel-resonant tank circuit connected to the output of constant-current radio-frequency oscillator 18. The tank circuit is tuned to the oscillator frequency and therefore a substantial radio-frequency voltage appears across the combination 11—17. This voltage has a constant amplitude except during those periodic instances at which the output frequency of oscillator 18 and the modulated magnetic field generated by magnets 12 and 13 and modulation coils 14 and 15 satisfy the requirements for nuclear resonance.

During resonance, material 10 absorbs energy from the radio-frequency field so as to periodically load coil 11. As is well known, the loading of a parallel tank circuit lowers the "Q" of the tank, thereby reducing the parallel impedance of the voltage appearing across the tank. The periodic absorption of energy by material 10 amplitude modulates the radio-frequency voltage appearing across tank circuit 11—17. The amplitude of this modulation component varies in accordance with the number of nuclei present to absorb energy from tank coil 11.

The voltage appearing across tank circuit 11—17 is applied to the input of radio-frequency amplifier 19. The signal output of radio-frequency amplifier 19 is in turn applied to the input of detector and audio-frequency amplifier 20 which has an output connected to signal switch and readout means 21.

In a typical prior art installation, readout at 21 may be accomplished by an oscilloscope in which the vertical amplifier input terminals are connected to audio amplifier 20. The oscilloscope sweep is synchronized by an audio-frequency voltage generated by modulation source 16. This arrangement, therefore, produces a fixed pulse on the oscilloscope screen that varies in amplitude in accordance with the quantity of absorbing substance of the material 10 under test.

In the event the signal-to-noise ratio is exceedingly poor, difficulty can be encountered when one attempts to distinguish the absorption signal pulse from the random noise pulses. Accordingly, in the structure making up the signal switch and readout means 21, an advantageous mode of operation is provided which switches out the noise between the adjacent absorption pulses. Accurate readout may then be accomplished on an oscilloscope or on a meter. In order to maintain the true pulse shape and also to maintain a zero meter reading independent of noise amplitude or system gain it is desirable to use a direct coupled switching amplifier to gate the resonance signals. A satisfactory readout circuit for unit 21 is disclosed in applicant's copending application for Signal Switch and Readout for NMR Apparatus, Serial No. 40,754, filed July 5, 1960, now Patent No. 2,999,974.

In general, signal switch and readout 21 is preferably a direct-coupled electronic switch which has a very low drift, no gate threshhold, no signal base (that is, the switch will pass absorption pulse signals down to a zero amplitude) and which will switch positive or negative signals from zero to 40 volts amplitude. Gate pulse generator and timing section 22 generates a gate signal pulse 23 which is used to gate signal switch and readout 21 so that this latter unit will pass the desired absorption signals. The gate signal pulse 23 used in effecting this switching operation is developed by a conventional timing section in which the 60 cycles per second field modulation voltage of the modulator 16 is phase shifted, amplified and used to trigger a monostable multivibrator. The monostable multivibrator output generates the signal gate pulse 23. The gate signal pulse 23 is phased (by a phase shift network included within pulse generator 22) to coincide with the absorption pulse train 24 (FIG. 6A) applied to the input of signal switch and readout 21 from amplifier 20. The detailed circuit arrangement for gate pulse generator and timing section 22 is not described herein for the reason that this structure is conventional and may be constructed in accordance with current knowledge and techniques.

Loss of the resonance condition $$f_0 = \frac{\gamma}{2\pi} H_0$$

can occur as a result of excessive variations in the intensity of the magnetic field, changes in the magnetic flux path, or through drift in the frequency of the radio-frequency field.

The resonance control section 25 of this invention maintains the resonance relationship by monitoring the output of signal switch and readout section 21 and controlling the radio-frequency oscillator 18 through negative feedback. The gate signal pulse 23 and the noise-free absorption pulse output 28 are applied to the input of resonance control section 25.

Figure 2:
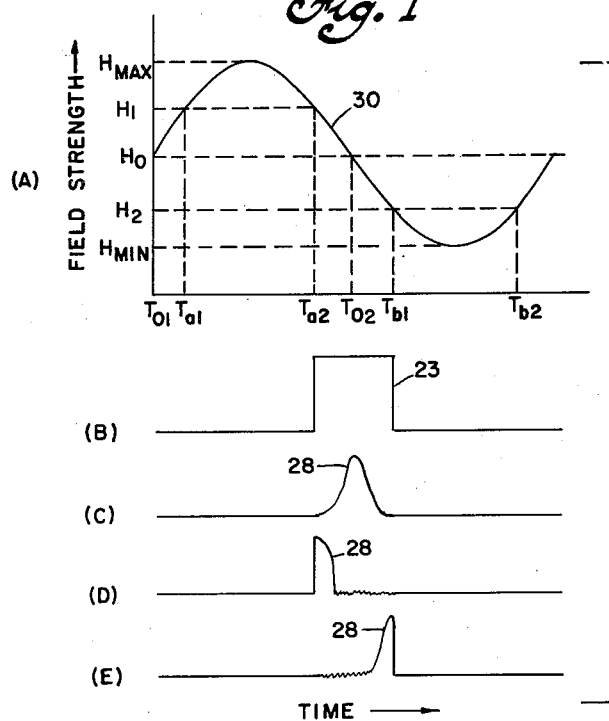
FIG. 2A is a graph showing a constant magnetic field modulated by a single alternating-current cycle.
FIG. 2B through FIG. 2E is a group of waveforms generated in the circuits of FIG. 1 and combined FIGS. 4 and 5, and associated timewise with the modulation curve of FIG. 2A.

Referring to FIG. 2A, the desired mode of operation is for resonance to take place when the oscillating magnetic field 30 (FIG. 6B) generated by coils 14 and 15 crosses the value of the fixed field generated by permanent magnets 12 and 13. In other words, the field-strength null points of each modulation cycle 30 are superimposed on the permanent magnet field strength as shown at points ($T_{01}$—$H_0$), ($T_{02}$—$H_0$). This would position the absorption pulse 28 (FIG. 2C, FIG. 6J) in the center of the signal gate pulse (FIG. 2C). If the frequency of the radio-frequency oscillator 18 is increased slightly, resonance will still occur, however, at times $T_{a1}$ and $T_{a2}$. At this time, the radio-frequency field and magnetic field have the resonance relationship $$f_1 = \frac{\gamma H_1}{2\pi}$$

A slight decrease in radio-frequency causes resonance to occur at times $T_{b1}$ and $T_{b2}$, when the fields have the relationship $$f_2 = \frac{\gamma}{2\pi} H_2$$

Resonance will not occur if the radio frequency exceeds $$f = \frac{\gamma}{2\pi} H \text{ max.}$$

or is less than $$f = \frac{\gamma}{2\pi} H \text{ min.}$$

At times $T_{a2}$ and $T_{b1}$ the absorption pulse 28 will only be partially in the signal gate pulse (FIG. 2B) as shown in FIG. 2D and 2E.

The radio-frequency oscillator 18 is controlled through a conventional reactance tube circuit contained within frequency-control section 31 (FIG. 1) by a voltage which is developed by time descrimination of the absorption pulse train 28 so that resonance occurs at times $T_{01}$ and $T_{02}$.

Referring to the schematic of FIGS. 4 and 5 combined as shown in FIG. 3, and to the waveforms of FIG. 6, the resonance section 25 of this invention operates in the following manner:

Frequency error is defined as the difference between the frequency of the radio-frequency oscillator 18 and the frequency, $$f_0 = \frac{\gamma}{2\pi} H_0$$

(resonance occurring at times $T_{01}$ and $T_{02}$). Direct-current error is defined as the direct-current voltage developed in a feedback network of the resonance control section 25 which is proportional to the frequency error.

The absorption signal train 28 (FIG. 6J) at the output of the signal switch and readout section (FIG. 4) is applied to the control grid of amplifier tube T1 through coupling capacitor 33, ground return resistor 34, and isolation resistor 35. The absorption signal is integrated in the grid circuit of amplifier tube T1 by capacitor 33 to improve the signal-to-noise ratio. The amplified absorption signal appearing across plate load resistor 36 is applied to the control grid of error stop amplifier tube T2 through coupling capacitor 37 and grid resistor 38.

The signal gate pulse train 23 (FIG. 6F) at the output of gate pulse generator and timing section 22 is applied to the anode of signal gate multivibrator tube T3 through coupling capacitor 40. Capacitor 41 and resistor 42 also apply the differential of the signal gate pulse 23 to the control grid of tube T2. The differential of the signal gate train 23 and the amplified absorption signal are added in the grid circuit of tube T2 so that the composite waveform of FIG. 6K is applied thereto. The composite signal (FIG. 6K) amplified in error stop amplifier tube T2 appears across plate load resistors 43 and 44.

An adjustable portion of the amplified composite signal is applied to the control grid of tube T4. Tubes T4, T5 and associated components comprise a cathode-coupled binary multivibrator circuit (also known as a Schmitt trigger squaring circuit after its inventor). This particular multivibrator circuit is described in detail at pages 164 through 173 of the book "Pulse and Digital Circuits," written by Millman and Taub, and published in 1956 by the McGraw-Hill Book Company, Inc.

The output of the cathode-coupled binary multivibrator comprising tubes T4, T5 and associated components appearing across plate load resistor 46 is a one millisecond negative square wave having its leading edge coincident with the leading edge of the gater absorption pulse (FIG. 6J). If the absorption pulse 28 moves out of time coincidence with the signal gate pulse 23 (FIG. 6F), due to change in the radio frequency $f_0$ or removal of the sample 10 from the measuring probe, the cathode-coupled binary multivibrator T4, T5 will trigger on the trailing edges of the signal gate pulse. Multivibrator T4, T5 is therefore appropriately called an error-stop multivibrator. Therefore, there has been developed a trigger pulse which occurs in time coincidence with the leading edge of the gated absorption pulse 28. In the event of loss of the absorption pulse from the gate, the trigger pulse will occur at time $T_{b1}$ (FIG. 2A).

The trigger pulse output of error-stop multivibrator T4, T5 is applied to the anode of tube T6 through coupling capacitor 50 and diode 51. Tubes T6, T7 and associated components comprise a bistable multivibrator, which is herein called the error multivibrator. Tubes T8, T9 and associated components comprise a conventional bistable multivibrator, which is herein called the reference multivibrator. The leading edge of the output signal appearing at the anode of tube T8 is applied to the anode of tube T7 through coupling capacitor 52 and diode 53 to flip error multivibrator T6, T7 to one of its stable states. The trigger pulse output of error-stop multivibrator T4, T5 is used to flip error multivibrator T6, T7 to its other stable state. The output signal of error multivibrator T6, T7 appearing at the anode of tube T6 (FIG. 6G) is, therefore a square wave which varies in time duration in accordance with the relative positioning of the absorption pulse 28 relative the signal gate pulse 23.

Tubes T3, T10 and associated components comprise a conventional single shot multivibrator herein called the signal gate multivibrator. The leading edge of the signal gate pulse 23 (FIG. 6F) applied to the anode of tube T3 triggers the signal gate multivibrator. The output of the signal gate multivibrator T3, T10 appearing at the anode of tube T10 is applied to the anode of reference multivibrator tube T9 through diode 56, and capacitor 57, thereby flipping the reference multivibrator to one of its stable states. The output signal of phase amplifier tube T11 appearing across load resistor 60 is applied to the control grid of reference multivibrator tube T8 through coupling capacitor 59, thereby flipping the reference multivibrator to the other of its stable states. FIG. 6D shows the signal wave form appearing at the anode of tube T8; and FIG. 6E shows the signal waveform appearing at the anode of tube T9. The waveform of FIG. 6E constitutes the reference multivibrator output which is applied to a difference detector network 61 comprising resistors 90, 91 and 92 (FIG. 5) through potentiometer 62 and coupling capacitor 63.

The primary winding of phase amplifier line transformer 65 is connected to a 110 volt A.C. line. The total voltage of the secondary winding is applied to inductor 66 and phase adjust potentiometer 67. The cathode of tube T11 is connected to the secondary winding centertap through resistor 68. The alternating-current waveform of FIG. 6C is accordingly applied to the control grid of tube T11. Potentiometer 67 adjusts the phase of this waveform so that the leading edge 70 of the reference multivibrator output of FIG. 6E is removed timewise from gate pulse 23 (FIG. 6F).

It should be noted that the leading edge 71 of the error multivibrator output of FIG. 6G coincides timewise with the leading edge 70 of the reference multivibrator output. The trailing edge 72 of the reference multivibrator output of FIG. 6E coincides timewise with the leading edge 73 of signal gate pulse 23 (FIG. 6F), and the trailing edge 74 of the error multivibrator output (FIG. 6G) coincides timewise with the leading edge of absorption signal pulse 28 (FIG. 6J). The output of the reference multivibrator is therefore a square wave of predetermined time length, and the output of the error multivibrator is a square wave which varies in duration in accordance with the position of the absorption pulse 28 relative signal gate pulse 23.

The error multivibrator T6, T7 output square wave (FIG. 6G) is applied to the control grid of error multivibrator amplifier tube T12 through coupling capacitor 80. The error multivibrator amplifier signal (FIG. 6H) developed at the anode of tube T12 is applied to input terminal 79 of difference detector 61 through potentiometer 81 and coupling capacitor 82. Resistor 83 and diode 84 clamp the signal voltage appearing at terminal 79 relative ground.

The reference multivibrator output (FIG. 6E) is applied to input terminal 86 of difference detector 61. Resistor 87 and diode 88 clamp the signal voltage appearing at terminal 86 relative ground. Resistors 90, 91, and 92 comprise the difference detector 61.

The two clamped signals applied to terminals 79 and 86 are added in the difference detector to produce a negative square wave (FIG. 6I) at terminal 100 with a variable duration of from 0 to 1 millisecond.

The difference detector 61 in effect increases the percentage change in the error square wave duration with change in position of the absorption pulse 28 relative signal gate pulse 23. While the error square wave changes in time by one millisecond (duration of signal gate pulse 23) out of 8.3 millisecond in a typical installation, the output of the difference detector 61 changes one millisecond out of one millisecond as the absorption pulse 28 moves through the signal gate pulse 23 timewise.

The output of the difference detector 61 is integrated in an integrator comprising resistor 101 and capacitor 102 producing a negative direct-current error signal at terminal 103 proportional to the frequency error.

If the only system drift (i.e., loss of the relationship $$f_0 = \frac{\gamma}{2\pi} H_0 )$$

were due to radio-frequency oscillator 18 instability the integrated output of the difference detector 61 at terminal 103 could be inverted and connected directly to the reactance tube input of frequency control 31. However, since there can also be magnetic field changes, connection of the feedback network in this manner would lead to oscillation in the direct-current error signal.

This oscillation would be brought about as follows: A small change in the value of the magnetic field would produce a proportional shift of the absorption pulse 28 relative the signal gate pulse 23 and a proportional direct-current error voltage at the output of the difference detector at terminal 100. This would shift the frequency of radio-frequency oscillator 18 to a value necessary to position the absorption pulse 28 in the center of the signal gate pulse 23. However, this would bring about a change in direct-current error voltage which, in turn, would shift the radio frequency and the control action would repeat. Oscillation of the position of the absorption pulse 28 would result.

This oscillation is prevented by the operational amplifier AMP1 being connected as an integrator. (The output at terminal 104 is the negative integral of the input at terminal 105.) The direct-current error signal at terminal 103, which is always negative, is added to a postive reference voltage at terminal 106 which is equal in absolute value to the direct-current error signal developed when the absorption pulse 28 is centered in the signal pulse 23. Therefore, the output of AMP1 at terminal 104 is zero for resonance occurring at time $T_{02}$ and there is no error signal fed back to the reactance tube of frequency control 31.

However, a slight shift in absorption pulse 28 regardless of cause will result in a net input (either positive or negative) to AMP1.

AMP1 integrates this input at terminal 105 producing an output voltage at terminal 104 applied to frequency control 31 which changes the frequency of the radio-frequency oscillator 18. As the radio frequency changes, the direct-current error voltage is brought back to the reference value resulting in zero input to AMP1. When the input voltage has returned to zero there is no further change in error signal feedback and the radio-frequency oscillator 18 is held at a new frequency until some further drift in resonance conditions causes a shift in line position.

When the absorption pulse 28 moves out of the signal gate pulse 23, due to removal of the sample 10 from the sample probe or due to sudden changes in resonance conditions which over-ride the feedback control, the input to AMP1 will go negative. This is because the square wave output of the error multivibrator T6, T7 increases in duration being now triggered by the trailing edge of the signal gate pulse 23.

This causes the output of AMP1 to go increasingly positive as the negative input is integrated. At a predetermined positive level (approximately 2 volts) a sweep circuit is triggered which feeds a sweep voltage to the reactance tube of frequency control 31 and causes the radio-frequency oscillator 18 to sweep over a frequency range of approximately 3 kilocycles. The oscillator, therefore, hunts for the proper frequency necessary to satisfy the relationship $$f_0 = \frac{\gamma}{2\pi} H_0$$

When the radio frequency reaches the value $f_0$, the feedback network causes the radio-frequency oscillator to lock on and hold this frequency.

The sweep circuit operates in the following manner. When the output of AMP1 reaches approximately 1 volt, thyratron T13, which is biased at approximately −2 volts by potentiometer 110, will fire, triggering the relaxation oscillator comprising tube T14 and associated components. Each time T14 fires (5 or 6 times each time T13 fires), monostable multivibrator comprising tubes T15, T16 and associated components will fire, feeding back a positive square wave through coupling capacitor 111 to terminal 93 of the difference detector 61 to be added to the negative error square wave. Neon tube 116, preferably located on the front panel represented at P for visual observation, is connected in the plate circuit of T15 and flashes each time the multivibrator operates. Thus T16 acts as a sweep indicator, flashing during the sweep cycle and staying out during frequency lock on and control.

The result is that the input of AMP1, which had a net negative value, is caused to go positive. This positive voltage is integrated in AMP1 driving the output negative. Thyratron T13 will now extinguish T14 and multivibrator T15, T16 will cease oscillation, and the net input to AMP1 will again become negative. The output of AMP1 will thus go positive and the cycle will repeat when the output reaches 1 volt.

If the absorption pulse 28 appears in the signal gate pulse during the sweep cycle, the net input to AMP1 will go to zero and the sweep cycle will stop with feedback control action going into effect.

It should be understood that the above described arrangements are merely illustrative of the principles of this invention and that numerous other modifications may be provided without departing from the scope of the invention.

What is claimed is:

1. In nuclear magnetic resonance measuring apparatus having means generating a radio-frequency field, means generating an otherwise steady magnetic field that is amplitude modulated cyclically by a superimposed magnetic field which reverses from one magnetic polarity to the other by passing through field strength null points so that the condition for nuclear resonance is periodically attained for a sample material under test to generate thereby a periodic resonance absorption pulse signal, and an absorption pulse signal readout circuit that is gated by means generating a periodic gate pulse train whose individual pulses coincide timewise with the field-strength null points of each modulation cycle and in which each gate pulse is of a time duration several times that of each absorption pulse signal, the improvement comprising means determining the time at which resonance occurs by comparing the time relationship of each resonance absorption pulse relative a gate pulse and generating an error signal indicative of a deviation in said time relationship, means responsive to said error signal for varying the frequency of the field generated by said radio-frequency means to cause each resonance absorption pulse and gate pulse in coincidence to assume a predetermined time coincidence relationship relative one another in which the absorption pulse is fixed timewise relative the times of rise and fall for each coinciding gate pulse and means activated by an increase in said error signal exceeding a predetermined maximum value for causing said radio-frequency field generating means to sweep through a frequency range wherein said resonance absorption pulses will coincide timewise with said gate pulses.

2. The combination of claim 1 including monitor means rendering an indication only during the time period said sweep means is sweeping the radio-frequency of the field generated by said radio-frequency means.

3. In nuclear magnetic resonance measuring apparatus having means generating a radio-frequency field, means generating an otherwise steady magnetic field that is amplitude modulated cyclically by a superimposed magnetic field which reverses from one magnetic polarity to the other by passing through field strength null points so that the condition for nuclear resonance is periodically attained for a sample material under test to generate thereby a periodic resonance absorption pulse signal, and an absorption pulse signal readout circuit that is gated by means generating a periodic gate pulse train with each gate pulse centered timewise with a field-strength null point of each modulation cycle and in which each gate pulse is of a time duration several times that of each absorption pulse signal, the improvement comprising means determining the time at which resonance occurs by comparing the time relationship of each resonance absorption pulse relative a gate pulse and generating an error signal indicative of a deviation in said time relationship, means responsive to said error signal for varying the frequency of the field generated by said radio-frequency means to cause each resonance absorption pulse and gate pulse in coincidence to assume a predetermined time coincidence relationship relative one another in which the absorption pulse is centered timewise relative the gate pulse and means activated by an increase in said error signal exceeding a predetermined maximum value for causing said radio-frequency field generating means to sweep through a frequency range wherein said resonance absorption pulses will coincide timewise with said gate pulses.

4. The combination of claim 3 including monitor means rendering a visual indication only during the time period said sweep means is sweeping the radio-frequency of the field generated by said radio-frequency means.

5. In nuclear magnetic resonance measuring apparatus having means generating a radio-frequency field, means generating a magnetic field that is amplitude modulated cyclically so that the condition for nuclear resonance is periodically attained for a sample material under test to generate thereby a periodic resonance absorption pulse signal, and an absorption pulse signal readout circuit that is gated by means generating a periodic gate pulse train whose individual pulses coincide timewise with the field-strength null points of the modulation waveform, the improvement comprising means generating a reference square wave pulse having a time duration determined by the occurrence of a first characteristic of each gate pulse, means generating an error square wave pulse having a time duration determined by an absorption pulse gated by each gate pulse, and means comparing the time length of each reference square wave pulse with that of an error square wave pulse, and means responsive to said comparing means for varying the frequency of said radio-frequency field until each absorption pulse is centered timewise relative its associated gate pulse.

6. In nuclear magnetic resonance measuring apparatus having means generating a radio-frequency field, means generating a magnetic field that is amplitude modulated cyclically so that the condition for nuclear resonance is periodically attained for a sample material under test to generate thereby a periodic resonance absorption pulse signal, and an absorption pulse signal readout circuit that is gated by means generating a periodic gate pulse train whose individual pulses coincide timewise with the field-strength null points of the modulation waveform, the improvement comprising means generating a reference square wave pulse train whose individual pulses have a time duration determined by the leading edge of each gate pulse, means generating an error square wave pulse train whose individual pulses start in time coincidence with each reference square wave pulse and each error square wave pulse having a time duration determined by the leading edge of an absorption pulse associated with each gate pulse, a difference detector comparing the time length of each reference square wave pulse with that of an associated error square wave pulse, error-stop means operated by the trailing edge of each gate pulse not in time coincidence with an absorption pulse, to limit the time duration of the error square wave pulse, means responsive to said difference detector for sweeping the frequency of the radio-frequency field generated by the radio-frequency means through a predetermined frequency range when the trailing edge of a gate pulse limits the time duration of an error square wave pulse until an absorption pulse coincides timewise with an associated gate pulse, and means responsive to said difference detector for further varying the frequency of the radio-frequency field generated by the radio-frequency means when an absorption pulse coincides timewise with an associated gate pulse to center the absorption pulse timewise relative the gate pulse.

7. The combination of claim 6 including monitor means rendering a visual indication during the time period said sweep means is sweeping the radio-frequency of the field generated by said radio-frequency means.

References Cited in the file of this patent

UNITED STATES PATENTS

| 2,705,284 | Hershberger | Mar. 19, 1955 |
| 2,912,641 | Ruble | Nov. 10, 1959 |
| 2,922,947 | Bloom et al. | Jan. 26, 1960 |
| 3,045,175 | Rollwitz | July 17, 1962 |

FOREIGN PATENTS

| 1,133,479 | France | Nov. 19, 1956 |

OTHER REFERENCES

Waugh: Annals of the New York Academy of Sciences, vol. 70, art. 4, June 16, 1958, pp. 920 to 922 relied on.